(12) United States Patent
Pu et al.

(10) Patent No.: US 11,618,847 B2
(45) Date of Patent: Apr. 4, 2023

(54) METHODS FOR PREPARING AND APPLYING A NANO EMULSIFIER

(71) Applicant: SOUTHWEST PETROLEUM UNIVERSITY, Sichuan (CN)

(72) Inventors: Wanfen Pu, Chengdu (CN); Xing Zhao, Chengdu (CN); Rui Liu, Chengdu (CN); Lin Sun, Chengdu (CN); Daijun Du, Chengdu (CN)

(73) Assignee: SOUTHWEST PETROLEUM UNIVERSITY, Chengdu (CN)

( * ) Notice: Subject to any disclaimer, the term of this patent is extended or adjusted under 35 U.S.C. 154(b) by 0 days.

(21) Appl. No.: 17/235,903

(22) Filed: Apr. 20, 2021

(65) Prior Publication Data

US 2022/0127517 A1   Apr. 28, 2022

(30) Foreign Application Priority Data

Oct. 23, 2020   (CN) .......................... 202011146761.X (51) Int. Cl.
*E21B 43/16* (2006.01)
*C09K 8/584* (2006.01)
*C09K 8/588* (2006.01)

(52) U.S. Cl.
CPC .............. *C09K 8/584* (2013.01); *C09K 8/588* (2013.01); *E21B 43/16* (2013.01); *C09K 2208/10* (2013.01)

(58) Field of Classification Search
CPC .......... C09K 8/584; C09K 8/588; E21B 43/16
(Continued)

(56) References Cited

U.S. PATENT DOCUMENTS 9,234,126 B2 *   1/2016   Karale .................... C09K 8/82
9,505,970 B2 *  11/2016   Vaughn ................... C09K 8/40
(Continued)

FOREIGN PATENT DOCUMENTS

CN    101125685 A    2/2008
CN    103320100 A    9/2013
(Continued)

OTHER PUBLICATIONS

He, Jiangchuan et al., Oilfield Development Strategy and Replacement Techniques, Acta Petrolei Sinica, 33(3): 519-525, 2012.
(Continued)

*Primary Examiner* — William D Hutton, Jr.
*Assistant Examiner* — Ashish K Varma
(74) *Attorney, Agent, or Firm* — Metis IP LLC (57) ABSTRACT

The present disclosure discloses methods for preparing an in-situ nano emulsifier. The preparation method may include obtaining a solution by dissolving hydrated ferric chloride (or ferric chloride) and hydrated ferrous sulfate (or ferrous sulfate) into deionized water at a first temperature; obtaining an ethanol solution dissolved with an oil-soluble surfactant by dissolving an oil-soluble surfactant into ethanol at a second temperature; and adding a certain volume of ammonia water and the ethanol solution dissolved with the oil-soluble surfactant in the solution to obtain an in-situ nano emulsifier. The in-situ nano emulsifier may be applied to development of the oil reservoir through an application process. The application process may include preparing a nano emulsifier solution and a surfactant solution; sequentially injecting the surfactant solution and the nano emulsifier solution into a formation; and injecting a spacer liquid slug into the formation for replacement.

8 Claims, 7 Drawing Sheets

(58) Field of Classification Search
USPC .................................................. 166/305.1
See application file for complete search history.

(56) References Cited

U.S. PATENT DOCUMENTS

| | | | | |
|---|---|---|---|---|
| 10,294,764 | B2* | 5/2019 | Champagne | C09K 8/602 |
| 2003/0236173 | A1* | 12/2003 | Dobson, Jr. | C09K 8/035 |
| | | | | 507/110 |
| 2009/0281004 | A1* | 11/2009 | Ali | C09K 8/602 |
| | | | | 507/263 |
| 2011/0290491 | A1* | 12/2011 | Gupta | C09K 8/685 |
| | | | | 166/305.1 |
| 2020/0231858 | A1 | 7/2020 | Arshad et al. | |

FOREIGN PATENT DOCUMENTS

| | | | |
|---|---|---|---|
| CN | 103937478 | A | 7/2014 |
| CN | 104403030 | A | 3/2015 |
| CN | 108690573 | A | 10/2018 |
| CN | 109251741 | A | 1/2019 |
| CN | 110373171 | A | 10/2019 |
| CN | 110439517 | A | 11/2019 |
| CN | 110454132 | A | 11/2019 |
| CN | 110776898 | A | 2/2020 |
| EP | 2804186 | A1 | 11/2014 |
| WO | 2015076755 | A1 | 5/2015 |

OTHER PUBLICATIONS

Koottungal L., 2014 Worldwide EOR Survey, Oil and Gas Journal, 112(4): 79-91, 2014.
Seright R. et al., Stability of Partially Hydrolyzed Polyacrylamides at Elevated Temperatures in the Absence of Divalent Cations, SPE Journal, 15(02): 341-348, 2010.
Galindo-Alvatez J. et al., Viscous Oil Emulsification by Catastrophic Phase Inversion: Influence of Oil Viscosity and Process Conditions, Industrial & Engineering Chemistry Research, 50(9): 5575-5583, 2011.
Pang, Shishi et al., Investigation into the Properties of Water-in-heavy Oil Emulsion and its Role in Enhanced Oil Recovery During Water Flooding, Journal of Petroleum Science and Engineering, 177: 798-807, 2019.
First Office Action in Chinese Application No. 20201114761.X dated Dec. 27, 2021, 15 pages.
Hosein Rezvani et al., Experimental Investigation of Interfacial Properties in the EOR Mechanisms by the Novel Synthesized Fe3O4@Chitosan Nanocomposites, Colloids and Surfaces A: Physicochem. Eng. Aspects, 2018, 48 pages.
Qu, Haiying, Study on Modified Fe3O4 Nanoparticle Stabilized Foam System for Enhanced Oil Recovery, Chinese Master's Theses Full-text Database Engineering Science and Technology I, 2022, 69 pages.
Qin, Kunhua et al., Research Progress on Preparation and Surface Modification of Fe3O4 Magnetic Nano-particles, China Powder Science and Technology, 14(2): 59-63, 2008.
Feng, Huixia et al., Study on synthesis, surface modification and application of magnetic magnetite nanoparticles, Applied Chemical Industry, 40(7): 1248-1253, 2011.

* cited by examiner

100

110
Obtaining a solution to be reacted by dissolving hydrated ferric chloride and hydrated ferrous sulfate into deionized water at a first temperature

120
Obtaining an ethanol solution dissolved with an oil-soluble surfactant by dissolving the oil-soluble surfactant into ethanol at a second temperature

130
Adding a certain volume of ammonia water and the ethanol solution dissolved with the oil-soluble surfactant in the solution to be reacted, and reacting the mixture to obtain a nanoemulsifier

510 — Preparing a nanoemulsifier solution and a surfactant solution

520 — Injecting the surfactant solution and the nanoemulsifier solution into a formation sequentially 530 — Injecting a spacer liquid slug for replacement

METHODS FOR PREPARING AND APPLYING A NANO EMULSIFIER

CROSS-REFERENCE TO RELATED APPLICATIONS

The present disclosure claims priority of Chinese application No. 202011146761.X filed on Oct. 23, 2020, the contents of which are hereby incorporated by reference.

TECHNICAL FIELD

The present disclosure relates to the fields of colloid and interface chemistry, oilfield chemistry, and oilfield exploitation, and more particularly, relates to an in-situ nano emulsifier and an application of the in-situ nano emulsifier in developing an oil deposit.

BACKGROUND

When developing oil reservoirs by water drive, the fluidity of injected water is significantly higher than that of crude oil. As a result, a viscous fingering is easily formed in a front edge of a displacement and a sweeping efficiency of the water drive is low. Besides, the water advances along with a high-permeability layer, which causes serious water channeling in a high-permeability area. Therefore, the heterogeneity of the oil reservoir further deteriorates and a large amount of crude oil may not be swept. The above two reasons may lead to high moisture content in a produced liquid and a low recovery of oil by water drive. According to statistics, a maximum water flood recovery (the moisture content in the produced liquid is as high as 98%) in the most onshore oil reservoirs in our country is less than 30% (HE Jiangchuan et al., Oilfield Development Strategy and Replacement Techniques [J], Acta Petrolei Sinica, 2012, 33(3):519-525), and a large amount of crude oil in the formation may not be produced.

A polymer drive technique based on a fluidity control has developed rapidly and is a second largest technique in the world for enhancing the recovery (Koottungal L. 2014 Worldwide EOR Survey [J]. Oil and Gas Journal, 2014, 112(4): 79-91). A polymer-surfactant binary composite system (also referred to as a poly-surface binary drive) formed by adding a surfactant to a polymer solution may reduce an oil-water interfacial tension on the basis of the polymer fluidity control, improve water-oil-solid interface properties, and increase a sweep coefficient and oil displacement efficiency. The polymer drive and the poly-surface binary drive have been promoted in oilfields such as Daqing, Shengli, Bohai Bay, and Karamay in China, and have made important contributions to stabilizing oilfield production. An important prerequisite for the development of the polymer drive and the poly-surface binary drive is a complete special process injection system, which occupies a large area, has high energy consumption, and requires costs ranging from tens of millions to hundreds of millions. In addition, polymer macromolecular chains may be degraded by a superimposition of stirring shear and blasthole shear during the injection process, which reduces the fluidity control ability (Seright R., Campbell A., Mozley P., Han P. Stability of partially hydrolyzed polyacrylamides at elevated temperatures in the absence of divalent cations [J]. SPE Journal, 2010, 15(02): 341-348). Polyacrylamide and its derivatives with amide groups and carboxylic acids as main functional units have insufficient viscosity and poor long-term viscosity problems under high temperature and high salt conditions, which limits the scope of application of the polymer drive and the poly-surface binary drive in the development of oil reservoirs. Therefore, based on current injection equipment in the oilfield, it is urgent to develop a new technique of fast-dissolving, polymer-free, but with performances of the poly-surface binary drive.

SUMMARY

One aspect of the present disclosure provides a method for preparing an in-situ nano emulsifier. The method may include, to a three-necked flask of 500 milliliters, adding 80-160 grams of deionized water and adding sequentially 5-8 grams of hydrated ferric chloride and 1.2-1.6 grams of hydrated ferrous sulfate. The method may further include stirring a mixture in the three-necked flask at room temperature for 30-60 minutes to ensure sufficient dissolution. The method may further include dissolving 0.5-1.2 grams of oil-soluble surfactant in 10-30 grams of ethanol in an ice-salt bath, sealing and stirring the ethanol solution dissolved with the oil-soluble surfactant for 10-20 minutes to ensure sufficient dissolution. The method may further include, under protection of inert gas, adding 70-160 milliliters of ammonia water and the ethanol solution dissolved with the oil-soluble surfactant into the three-necked flask through two dropping funnels at a constant speed for 2-4 hours simultaneously. During the adding process, the mixture in the three-necked flask may be stirred quickly to ensure that the mixture in the three-necked flask is evenly mixed. The method may further include continuing stirring the mixture in the three-necked flask for 1-1.5 hours after the adding process, performing a suction filtration on the mixture after completion of the reaction to collect a solid product, and obtaining the in-situ nano emulsifier by grinding the solid product after dried in a vacuum at 50° C.

In some embodiments, a mass concentration of the ammonia water may be 25%. The inert gas may be nitrogen.

In some embodiments, a wettability of the nano emulsifier may be adjusted by selecting a type and an amount of the oil-soluble surfactant based on a geological condition of an oil reservoir and a viscosity of crude oil. The geological condition of the oil reservoir may include a size of permeability and heterogeneity of the oil reservoir.

In some embodiments, the in-situ nano emulsifier may include weakly hydrophobic and weakly oleophilic nano-colloidal particles. The in-situ nano emulsifier may be magnetic nano ferroferric oxide that is modified by the oil-soluble surfactant.

In some embodiments, the oil-soluble surfactant may include dodecylamine, oleic acid diethanolamide, octadecyl primary amine, and/or polyoxyethylene fatty alcohol ether.

In some embodiments, the in-situ nano emulsifier may be applied to the development of the oil reservoir through an application process. The application process may include injecting water into the in-situ nano emulsifier and stirring for 15-60 minutes to fully disperse and dissolve the in-situ nano emulsifier such that a nano emulsifier solution is prepared. A mass concentration of the nano emulsifier solution may be 0.3-2%. The application process may further include injecting water into a surfactant and stirring for 15-60 minutes to fully disperse and dissolve the surfactant such that a surfactant solution is prepared. A mass concentration of the surfactant solution may be 0.1-0.3%. The application process may further include injecting the surfactant solution of 0.05-0.15 times a pore volume of a target oil reservoir into a formation. The application process may further include injecting the nano emulsifier solution of 0.2-0.6 times the pore volume of the target oil reservoir into the formation. The application process may further include injecting a certain amount of oilfield injection water slug to replace.

In some embodiments, the surfactant may include sodium alkyl sulfonate, sodium alkylbenzene sulfonate, sodium fatty alcohol polyoxyethylene ether carboxylate, sodium fatty alcohol polyoxyethylene ether sulfonate, hydroxysulfobetaine, alkanol amide, alkyl glycoside, sodium alpha-olefin sulfonate, sodium carboxymethyl cellulose, and/or sodium lignosulfonate. An oil-water interfacial tension of the surfactant in the oil reservoir may be equal to or less than $10^{-2}$ mN/m.

In some embodiments, the mass concentration of the nano emulsifier solution may be 0.5%. The mass concentration of the surfactant solution may be 0.15%.

In some embodiments, the application process may be applied to all oil reservoirs developed by water injection including high temperature and high salt oil reservoirs and a portion of heavy oil reservoirs by water drive.

In some embodiments, a treatment distance between the surfactant and the nano emulsifier may be adjusted based on a size of spacer liquid slug, such that an intelligent oil displacement is realized by the in-situ nano emulsifier.

DETAILED DESCRIPTION

A large number of studies have found that oil-water emulsification is a common phenomenon in a process of development of an oil reservoir by water injection. The oil-water emulsification in a formation may require an external force and a certain amount of emulsifier. The external force may break the oil and water into droplets and one phase is evenly dispersed in the other phase. The emulsifier may be adsorbed on an oil-water interface to form a stable interfacial film, which prevents aggregation of the dispersed phase. A shearing effect applied on the oil and water flowing in porous media may be a source of external force. Since no additional chemical agents are added during a water drive process, the emulsifiers may be mainly derived from active components of crude oil itself. The crude oil may include beneficial components for emulsification. The beneficial components may be generally referred to as a natural emulsifier. The natural emulsifiers in the crude oil may include asphaltenes, gums, and acidic components. A type of emulsion spontaneously emulsified by the oil and water may be closely related to moisture content. For example, it may be easy to form a water-in-oil emulsion under a low moisture content condition. As the moisture content increases, an oil-external phase emulsion may undergo an Ostwald maturation and turn into an oil-in-water emulsion (Galindo-Alvarez J, Sadtler V, Choplin L, Salager J L. Viscous oil emulsification by catastrophic phase inversion: influence of oil viscosity and process conditions [J]. Industrial & Engineering Chemistry Research, 2011, 50 (9): 5575-5583). PU Wanfen et al. found that the emulsification in a water-injection development process of oilfields had an important impact on an oil recovery (Pang S, Pu W, Xie J, Chu Y, Wang C, Shen C. Investigation into the properties of water-in-heavy oil emulsion and its role in enhanced oil recovery during water drive [J]. Journal of Petroleum Science and Engineering, 2019, 177: 798-807). Since the type and viscosity of the emulsion have a huge difference in a high-permeability area and a low-permeability area, the oil-water spontaneously emulsified emulsion may be disadvantageous to the development of most oil reservoirs. When the moisture content of the oil reservoir is about 30-40%, a phase inversion of the water-in-oil emulsion may occur to form an oil-in-water emulsion with a viscosity lower than that of the crude oil. As an oil-water front advances, the moisture content of the oil reservoir may increase continually, an oil-in-water emulsion may be formed in the high-permeability area. The viscosity of the oil reservoir may decrease continually, the viscosity of the water-in-oil emulsion in the lower-permeability area may increase, which accelerates a formation of a viscosity fingering, such that a displacement efficiency of the front may be significantly low. Therefore, a key to achieve a fluidity control of the emulsion and a stable front for displacement and maximize oil recovery may be that the viscosity of the emulsion is greater than that of the crude oil, the emulsion does not undergo a phase inversion under a high moisture content condition, and in a water saturation range of the formation by water drive, the viscosity of the emulsion is proportional to the water saturation but inversely proportional to oil saturation.

Since the lipophilicity and hydrophilicity of the emulsion largely determine the type of emulsion, the type of emulsion may be adjusted by adding an emulsifier. Scholars at home and abroad have carried out extensive research on this, a variety of criteria for determining the lipophilicity of and hydrophilicity of the emulsifiers may be formed, such as Hydrophile-Lipophile Balance (HLB) value, Hydrophile-Lipophile deviation (HLD) value, etc. The HLB value may be determined based on a chemical structure of the emulsifier and a proportion of molecular weights of hydrophilic groups and lipophilic groups. For non-ionic surfactants, a surfactant with an HLB value of 4-8 may be easy to form a water-in-oil emulsion, and a surfactant with an HLB value of 9-12 may be easy to form an oil-in-water emulsion. The HLD value may be similar to the HLB value. However, the HLB value may also consider variations of the emulsifier itself and a system such as a temperature, a type of the emulsifier, properties of the crude oil, salts, etc. When the HLD value is equal to 0, the free energy required for the emulsifier to transfer from an oil phase to a water phase may be 0 and a spontaneous curvature of the system may be at a lowest value. However, even after a careful molecular structure design, the emulsifier may not guarantee the consistent type of the emulsion in a wide moisture content range, especially a water-in-oil viscosity-increasing emulsion with a high-internal phase is still formed in the high moisture content condition. A fundamental reason may be that in the high moisture content condition, a strength of an adsorption film of the emulsifier at the oil-water interface may not balance a Laplace pressure of the droplets, such that the water-in-oil emulsion undergoes the Ostwald maturation and performs a phase change to be the oil-in-water emulsion. After the water-in-oil emulsion performs the phase change to be the oil-in-water emulsion, the viscosity of the emulsion may be reduced by an order of magnitude, which may not be conducive to the stable oil displacement of the front.

Amphiphilic solid particles in a nano-micron size may be adsorbed on the oil-water interface to form the emulsion, which may be referred to as a Pickering emulsion. Compared with the emulsion formed by the emulsifier, the solid particles in the nano-micron size may produce irreversible adsorption on the oil-water interface, which builds a physical fence having a strong resistance on aggregation and prevents the emulsion from the Ostwald maturation, thereby forming a high-internal phase emulsion. Silica, clay, iron oxide, and solid phase substances in the crude oil may adsorb at the interface to stabilize the emulsion. However, these particles may be affected by the size, shape, morphology, density, concentration, surface coverage, and wettability of the particles. If the solid particles have a good stable performance under conditions of the environment (temperature, salinity) of the oil reservoir, the solid particles in the nano-micron size may be used in oilfield exploitation on a large scale. However, due to high surface energy, unmodified solid particles in the nano-micron size may be prone to agglomeration. The environment of the oil reservoir may aggravate the agglomeration. Therefore, a formation of colloidal particles in the nano-micron size that is stable under the environment of the oil reservoir may be an important prerequisite for the formation and efficient oil displacement of the Pickering emulsion with the high-internal phase.

The purpose of the present disclosure is to provide a method for preparing an in-situ nano emulsifier and an application of the in-situ nano emulsifier in developing an oil reservoir. The nano emulsifier prepared in the present disclosure may be nano colloidal particles that are weakly hydrophobic and lipophilic. The nano emulsifier prepared in the present disclosure may form a water-in-oil emulsion in a formation through an inverse bending effect of an oil-water interface. The emulsion may not undergo a phase change under a condition of water saturation of the oil reservoir. The viscosity of the emulsion may be proportional to the water saturation of the formation and inversely proportional to the oil saturation of the formation. The emulsion may adaptively control a fluidity and stabilize a displacement front. Therefore, the purpose of maximizing oil recovery may be achieved. Principles of the method are reliable and the raw materials used in the method are cheap and easy to obtain, such that the method has outstanding economic benefits and broad industrial application prospects.

Figure 1:
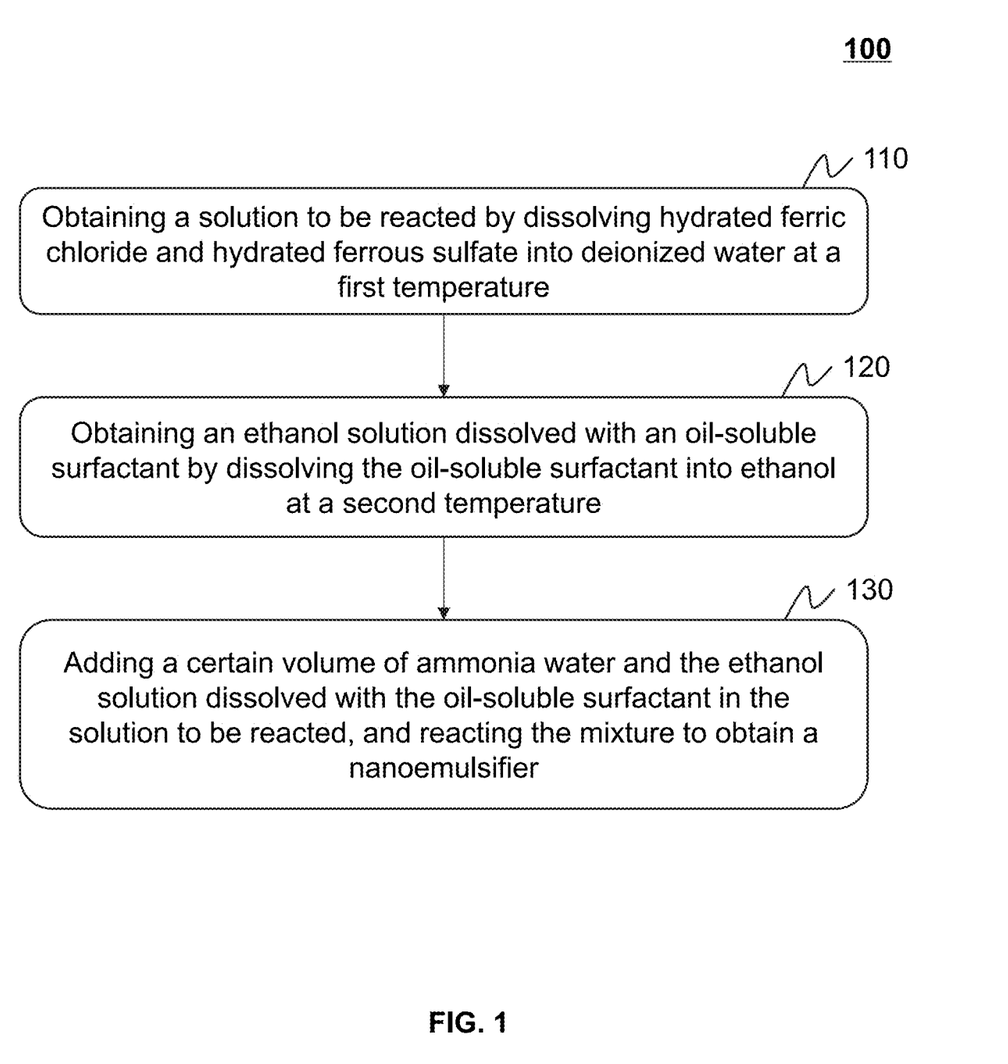
FIG. 1 is a flowchart illustrating an exemplary process for preparing a nano emulsifier according to some embodiments of the present disclosure.

FIG. 1 is a flowchart illustrating an exemplary process 100 for preparing a nano emulsifier according to some embodiments of the present disclosure.

In 110, a solution may be obtained by dissolving hydrated ferric chloride (or ferric chloride) and hydrated ferrous sulfate (or ferrous sulfate) into deionized water at a first temperature. As used herein, the solution obtained by dissolving hydrated ferric chloride (or ferric chloride) and hydrated ferrous sulfate (or ferrous sulfate) into deionized water may also be referred to as a first solution.

In some embodiments, the solution may be made of the hydrated ferric chloride with a mass of m1, the deionized water with a mass of m3, and the hydrated ferrous sulfate with a mass of m2. In some embodiments, a ratio of the mass m3 of the deionized water to the mass m1 of the hydrated ferric chloride may be within a range of 10-32. In some embodiments, the ratio of the mass m3 of the deionized water to the mass m1 of the hydrated ferric chloride may be within a range of 10-16. In some embodiments, the ratio of the mass m3 of the deionized water to the mass m1 of the hydrated ferric chloride may be within a range of 20-32. In some embodiments, the ratio of the mass m3 of the deionized water to the mass m1 of the hydrated ferric chloride may be within a range of 10-20. In some embodiments, the ratio of the mass m3 of the deionized water to the mass m1 of the hydrated ferric chloride may be within a range of 16-32. In some embodiments, the ratio of the mass m3 of the deionized water to the mass m2 of the hydrated ferrous sulfate may be within a range of 50-150. In some embodiments, the ratio of the mass m3 of the deionized water to the mass m2 of the hydrated ferrous sulfate may be within a range of 50-100. In some embodiments, the ratio of the mass m3 of the deionized water to the mass m2 of the hydrated ferrous sulfate may be within a range of 60-140. In some embodiments, the ratio of the mass m3 of the deionized water to the mass m2 of the hydrated ferrous sulfate may be within a range of 60-150. In some embodiments, the ratio of the mass m3 of the deionized water to the mass m2 of the hydrated ferrous sulfate may be within a range of 60-100.

In some embodiments, a mass concentration of iron ions in the solution to be reacted may be within a range of 1.5-2.6 wt %. In some embodiments, the mass concentration of iron ions in the solution to be reacted may be within a range of 1.7-2.4 wt %. In some embodiments, the mass concentration of iron ions in the solution to be reacted may be within a range of 1.9-2.2 wt %. In some embodiments, the mass concentration of iron ions in the solution to be reacted may be within a range of 2.0-2.1 wt %.

In some embodiments, the first temperature may be within a range of 18-25° C. In some embodiments, the first temperature may be within a range of 18-30° C. In some embodiments, the first temperature may be equal to 25° C.

In some embodiments, the deionized water with the mass of m3 (e.g., 80-160 grams) may be added into a container (e.g., a three-necked flask) with a certain volume (e.g., 500 milliliters). Then, the hydrated ferric chloride with the mass of m1 (e.g., 5-8 grams) and the hydrated ferrous sulfate with the mass of m2 (e.g., 1.2-1.6 grams) may be added to the container. The mixture in the container may be stirred for a certain time period (e.g., 30-60 minutes) at 18-25° C. until sufficiently dissolved. Merely by way of example, to a three-necked flask of 500 milliliters, 100 grams of the deionized water may be added, and 6 grams of hydrated ferric chloride and 14 grams of hydrated ferrous sulfate may be added. The mixture may be stirred at room temperature for 50 minutes until sufficiently dissolved.

In 120, an ethanol solution dissolved with an oil-soluble surfactant may be obtained by dissolving an oil-soluble surfactant into ethanol at a second temperature. As used herein, the ethanol solution dissolved with the oil-soluble surfactant may also be referred to as a second solution.

In some embodiments, the oil-soluble surfactant may refer to a surfactant including one or more lipophilic groups. Merely by way of example, the oil-soluble surfactant may include dodecylamine, oleic diethanolamide, octadecyl primary amine, polyoxyethylene fatty alcohol ether, or the like, or any combinations thereof. In some embodiments, the wettability of the nano emulsifier may be adjusted based on selecting a type and an amount of the oil-soluble surfactant based on a geological condition of the oil reservoir and a viscosity of crude oil in the oil reservoir. The geological condition of the oil reservoir may refer to a geological condition that affects the exploitation of the oil reservoir, for example, a depth, location, permeability, homogeneity, heterogeneity, etc. of the oil reservoir. Merely by way of example, the geological condition of the oil reservoir may include a size of permeability and the heterogeneity of the oil reservoir. The permeability of the oil reservoir may refer to an ability that allows liquid to pass through the entire oil reservoir under a certain pressure difference. The heterogeneity of the oil reservoir may refer to a variation relationship of parameters (e.g., chemical composition and physical properties) of the oil reservoir with space.

In some embodiments, the ethanol solution dissolved with the oil-soluble surfactant may be obtained by adding the oil-soluble surfactant with a mass of m4 to the ethanol with a mass of m5 at a certain temperature. In some embodiments, a ratio of the mass m5 of the ethanol to the mass m4 of the oil-soluble surfactant may be within a range of 5-60. In some embodiments, the ratio of the mass m5 of the ethanol to the mass m4 of the oil-soluble surfactant may be within a range of 5-25. In some embodiments, the ratio of the mass m5 of the ethanol to the mass m4 of the oil-soluble surfactant may be within a range of 25-60. In some embodiments, the ratio of the mass m5 of the ethanol to the mass m4 of the oil-soluble surfactant may be within a range of 5-20. In some embodiments, the ratio of the mass m5 of the ethanol to the mass m4 of the oil-soluble surfactant may be within a range of 20-60. In some embodiments, the ratio of the mass m5 of the ethanol to the mass m4 of the oil-soluble surfactant may be within a range of 20-25.

In some embodiments, a mass concentration of the oil-soluble surfactant in the ethanol solution dissolved with the oil-soluble surfactant may be 1.6%-16%. In some embodiments, the mass concentration of the oil-soluble surfactant in the ethanol solution dissolved with the oil-soluble surfactant may be 3.8%-16%. In some embodiments, the mass concentration of the oil-soluble surfactant in the ethanol solution dissolved with the oil-soluble surfactant may be 1.6%-3.8%. In some embodiments, the mass concentration of the oil-soluble surfactant in the ethanol solution dissolved with the oil-soluble surfactant may be 4.7%-16%. In some embodiments, the mass concentration of the oil-soluble surfactant in the ethanol solution dissolved with the oil-soluble surfactant may be 1.6%-4.7%. In some embodiments, the mass concentration of the oil-soluble surfactant in the ethanol solution dissolved with the oil-soluble surfactant may be 3.8%-4.7%.

In some embodiments, the second temperature may be less than 0° C. In some embodiments, the second temperature may be in a range of minus 20° C. to minus 10° C. In some embodiments, the second temperature may be in a range of minus 10° C. to 0° C.

In some embodiments, the ethanol solution dissolved with the oil-soluble surfactant may be prepared from 0.5-1.2 grams of the oil-soluble surfactant and 10-30 grams of the ethanol. In some embodiments, 0.5-1.2 grams of the oil-soluble surfactant may be dissolved in 10-30 grams of the ethanol under an ice-salt bath. The mixture of the oil-soluble surfactant and the ethanol may be stirred for a certain time period (e.g., 10-20 minutes) in the ice-salt bath until sufficiently dissolved. In some embodiments, 0.6 grams of the oil-soluble surfactant may be dissolved in 15 grams of the ethanol in the ice-salt bath, and the mixture of the oil-soluble surfactant and the ethanol may be sealed and stirred for 15 minutes until sufficiently dissolved.

In 130, a certain volume (e.g., 70-160 milliliters) of ammonia water and the ethanol solution dissolved with the oil-soluble surfactant may be added in the solution obtained in operation 110 to obtain an in-situ nano emulsifier.

The in-situ nano emulsifier refers to an emulsifier that may achieve a rapid emulsification using a nano-permeation technique. In a process of oil reservoir exploitation, the nano emulsifier may emulsify the crude oil and reduce a viscosity of the crude oil, thereby improving a fluidity of the crude oil and efficiency of oil displacement. In some embodiments, the oil-soluble surfactant may include weakly hydrophobic and weakly lipophilic nano-colloidal particles. For example, the in-situ nano emulsifier may be magnetic nano ferroferric oxide that is modified by the oil-soluble surfactant.

In some embodiments, a size of the nano emulsifier may be within a range of 10-1000 nanometers. In some embodiments, the size of the nano emulsifier may be within a range of 20-800 nanometers. In some embodiments, the size of the nano emulsifier may be within a range of 30-600 nanometers. In some embodiments, the size of the nano emulsifier may be within a range of 40-500 nanometers. As used herein, the size of the nano emulsifier refers to a diameter of a particle of the nano emulsifier.

In some embodiments, the reaction of the first solution obtained in operation 110 with the second solution (i.e., the ethanol solution dissolved with the oil-soluble surfactant) may be performed under protection of inert gas. Merely by way of example, the inert gas may be nitrogen.

In some embodiments, a mass concentration of the ammonia water may be within a range of 15-25%. In some embodiments, the mass concentration of the ammonia water may be within a range of 20-25%. In some embodiments, the mass concentration of the ammonia water may be within a range of 22-25%. In some embodiments, the mass concentration of the ammonia water may be equal to 25%. In some embodiments, a purpose of adding ammonia water may be to provide an alkaline environment for the reaction of the first solution with the second solution (i.e., the ethanol solution dissolved with the oil-soluble surfactant). In some embodiments, the ammonia water may be replaced by at least one of sodium carbonate or sodium bicarbonate.

In some embodiments, under the protection of the inert gas, the ammonia water and the ethanol solution dissolved with the oil-soluble surfactant may be simultaneously added into the three-necked flask filled with the first solution through two dropping funnels at a constant rate for a certain time period (e.g., 2-4 hours). During the adding process, the mixture in the three-necked flask may be stirred quickly to ensure that the mixture in the three-necked flask is evenly mixed. After the adding process, the mixture in the three-necked flask may be continued stirring for a certain time period (e.g., 1-1.5 hours). A suction filtration may be performed on the mixture after the completion of the reaction to collect a solid product. The in-situ nano emulsifier may be obtained by grinding the solid product after dried in a vacuum at a third temperature. In some embodiments, the third temperature may be within a range of 50-100° C. In some embodiments, the third temperature may be within a range of 50-80° C. In some embodiments, the third temperature may be within a range of 40-100° C. In some embodiments, the third temperature may be 50° C.

In some embodiments, under the protection of nitrogen, the ammonia water with a mass concentration of 25% and the ethanol solution dissolved with the oil-soluble surfactant may be simultaneously added into the three-necked flask filled with the first solution through two dropping funnels at a constant rate for 2 hours. During the adding process, the mixture in the three-necked flask may be stirred quickly to ensure that the mixture in the three-necked flask is evenly mixed. After the adding process, the mixture in the three-necked flask may be continued stirring for 1 hour. A suction filtration may be performed on the mixture after the completion of the reaction to collect a solid product. The in-situ nano emulsifier may be obtained by grinding the solid product after dried in the vacuum at 50° C.

Embodiments of Preparing the In-Situ Nano Emulsifier

Embodiment a: Preparation of an In-Situ Nano Emulsifier 1.

80 grams of deionized water were added to a three-necked flask of 500 milliliters, and 5 grams of hydrated ferric chloride and 1.2 grams of hydrated ferrous sulfate were added to the three-necked flask of 500 milliliters. The mixture in the three-necked flask was stirred at room temperature for 45-60 minutes to ensure sufficient dissolution. 0.75 grams of oleic acid diethanolamide was dissolved in 12 grams of ethanol in an ice-salt bath. The ethanol solution dissolved with the oleic acid diethanolamide was sealed and stirred for 15 minutes to ensure sufficient dissolution. Under the protection of nitrogen, 75 milliliters of ammonia water with a mass concentration of 25% and the ethanol solution dissolved with the oleic acid diethanolamide were simultaneously added into the three-necked flask through two adding funnels at a constant speed for 2 hours. During the adding process, the mixture in the three-necked flask was stirred quickly to ensure that the mixture in the three-necked flask was evenly mixed. After the dripping process, the mixture in the three-necked flask was continued stirring for 1 hour. After the completion of the reaction, suction filtration was performed on the mixture to collect a solid product. The solid product was ground after dried in a vacuum at 50° C. to obtain the in-situ nano emulsifier 1.

Embodiment b: Preparation of an In-Situ Nano Emulsifier 2.

100 grams of the deionized water were added to a three-necked flask of 500 milliliters, and 6 grams of the hydrated ferric chloride and 1.4 grams of the hydrated ferrous sulfate were added to the three-necked flask of 500 milliliters. The mixture in the three-necked flask was stirred at room temperature for 60 minutes to ensure sufficient dissolution. 0.6 grams of dodecylamine was dissolved in 15 grams of the ethanol in the ice-salt bath. The ethanol solution dissolved with the dodecylamine was sealed and stirred for 15 minutes to ensure sufficient dissolution. Under the protection of nitrogen, 100 milliliters of the ammonia water with the mass concentration of 25% and the ethanol solution dissolved with the dodecylamine were simultaneously added into the three-necked flask through two dropping funnels at the constant rate for 2.5 hours. During the adding process, the mixture in the three-necked flask was stirred quickly to ensure that the mixture in the three-necked flask was evenly mixed. After the adding process, the mixture in the three-necked flask was continued stirring for 1 hour. After the completion of the reaction, the suction filtration was performed on the mixture to collect a solid product. The solid product was ground after dried in the vacuum at 50° C. to obtain the in-situ nano emulsifier 2.

Embodiment c: Preparation of an In-Situ Nano Emulsifier 3.

120 grams of the deionized water were added to a three-necked flask of 500 milliliters, and then 8 grams of the hydrated ferric chloride and 1.6 grams of the hydrated ferrous sulfate were added sequentially. The mixture in the three-necked flask was stirred at room temperature for 60 minutes to ensure sufficient dissolution. 1.2 grams of octadecyl primary amine were dissolved in 30 grams of the ethanol in the ice-salt bath. The ethanol solution dissolved with the octadecyl primary amine was sealed and stirred for 15 minutes to ensure sufficient dissolution. Under the protection of nitrogen, 120 milliliters of the ammonia water with the mass concentration of 25% and the ethanol solution dissolved with the octadecyl primary amine were simultaneously added into the three-necked flask through two dropping funnels at the constant rate for 3 hours. During the adding process, the mixture in the three-necked flask was stirred quickly to ensure that the mixture in the three-necked flask was evenly mixed. After the adding process, the mixture in the three-necked flask was continued stirring for 1.5 hours. After the completion of the reaction, the suction filtration was performed on the mixture to collect a solid product. The solid product was ground after dried in the vacuum at 50° C. to obtain the in-situ nano emulsifier 3.

Embodiment d: Preparation of an In-Situ Nano Emulsifier 4.

160 grams of the deionized water were added to a three-necked flask of 500 milliliters, and 7.5 grams of the hydrated ferric chloride and 1.6 grams of the hydrated ferrous sulfate were added to the three-necked flask of 500 milliliters. The mixture in the three-necked flask was stirred at room temperature for 60 minutes to ensure sufficient dissolution. 1.2 grams of polyoxyethylene fatty alcohol ether were dissolved in 30 grams of the ethanol in the ice-salt bath. The ethanol solution dissolved with the polyoxyethylene fatty alcohol ether was sealed and stirred for 15 minutes to ensure sufficient dissolution. Under the protection of nitrogen, 160 milliliters of the ammonia water with the mass concentration of 25% and the ethanol solution dissolved with the polyoxyethylene fatty alcohol ether were simultaneously added into the three-necked flask through two dropping funnels at the constant rate for 4 hours. During the adding process, the mixture in the three-necked flask was stirred quickly to ensure that the mixture in the three-necked flask was evenly mixed. After the adding process, the mixture in the three-necked flask was continued stirring for 1.5 hours. After the completion of the reaction, the suction filtration was performed on the mixture to collect a solid product. The solid product was ground after dried in the vacuum at 50° C. to obtain the in-situ nano emulsifier 4.

Performance Research (or Referred to as Characterization) of the In-Situ Nano Emulsifier In some embodiments, the performance research of an in-situ nano emulsifier may include a particle size distribution of the nano emulsifier, an oil-water interfacial tension of a surfactant and the nano emulsifier, a wettability of the nano emulsifier, a viscosity of an emulsion formed by a dispersion liquid of the nano emulsifier and the crude oil, a microscopic morphology of a Pickering emulsion formed by the nano emulsifier, etc.

(1) The Particle Size Distribution of the Nano Emulsifier.

Figure 2:
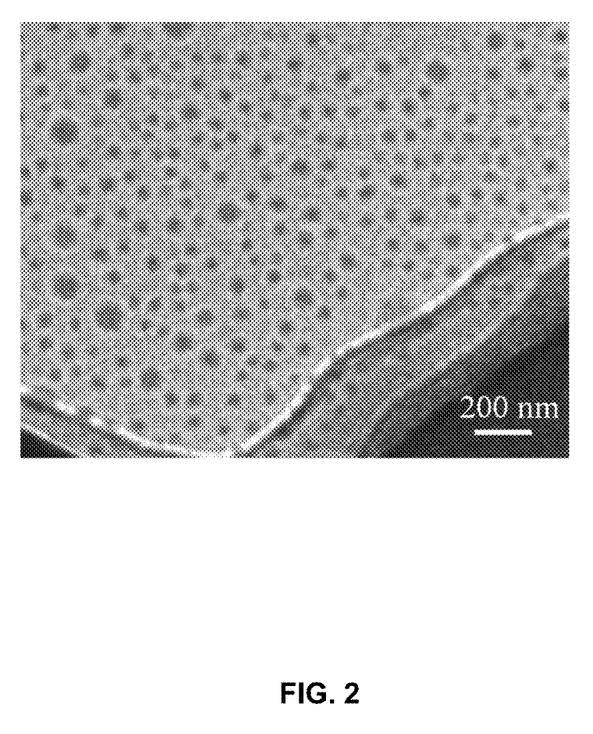
FIG. 2 is a microscopic view illustrating a nano emulsifier according to some embodiments of the present disclosure.

20 milligrams of the nano emulsifier 1 prepared in the Embodiment a were dispersed in 4 milliliters of ethanol to obtain a mixture. The mixture was sealed and sonicated for 15 minutes to obtain a dispersion liquid of the nano emulsifier 1. The dispersion liquid of the nano emulsifier 1 was dropped into a copper mesh, and then the dispersion liquid on the copper mesh was dried indoors. A transmission electron microscope (TEM, Hitachi H-9500) at a point resolution of 1.8 Å and an accelerating voltage of 300 kV was used to observe the microscopic morphology of the nano emulsifier 1 on the copper mesh in a dry state. As shown in FIG. 2, a diagram of the TEM microscopic morphology of the nano emulsifier 1 shows that the nano emulsifier 1 has a good dispersibility and uniform particle size. A median particle size of the nano emulsifier 1 is 80 nanometers.

(2) The Oil-Water Interfacial Tension of the Surfactant and the Nano Emulsifier.

Mineralized water with a salinity of $0.3\times10^4$ milligrams per liter (a concentration of $Ca^{2+}$ and $Mg^{2+}$ was $0.01\times10^4$ milligrams per liter) was prepared and numbered as 1. Mineralized water with a salinity of $1.5\times10^4$ milligrams per liter (a concentration of $Ca^{2+}$ and $Mg^{2+}$ was $0.02\times10^4$ milligrams per liter) was prepared and numbered as 2. Mineralized water with a salinity of $3\times10^4$ milligrams per liter (a concentration of $Ca^{2+}$ and $Mg^{2+}$ was $0.05\times10^4$ milligrams per liter) was prepared and numbered as 3. Mineralized water with a salinity of $5\times10^4$ milligrams per liter (a concentration of $Ca^{2+}$ and $Mg^{2+}$ was $0.07\times10^4$ milligrams per liter) was prepared and numbered as 4. Mineralized water with a salinity of $10\times10^4$ milligrams per liter (a concentration of $Ca^{2+}$ and $Mg^{2+}$ was $0.1\times10^4$ milligrams per liter) was prepared and numbered as 5. Each of the mineralized water 1-5 was stirred for 1 hour. Further, the mineralized water 1 was divided into two equal portions, and the two equal portions were respectively numbered as 1-1 and 1-2. The mineralized water 2 was divided into two equal portions, and the two equal portions were respectively numbered as 2-1 and 2-2. The mineralized water 3 was divided into two equal portions, and the two equal portions were respectively numbered as 3-1 and 3-2. The mineralized water 4 was divided into two equal portions, and the two equal portions were respectively numbered as 4-1 and 4-2. The mineralized water 5 was divided into two equal portions, and the two equal portions were respectively numbered as 5-1 and 5-2.

0.1% of sodium fatty alcohol polyoxyethylene ether sulfonate and 0.05% of hydroxysultaine were sequentially added to the mineralized water 1-1 to obtain a mixture corresponding to the mineralized water 1-1, and then the mixture corresponding to the mineralized water 1-1 was stirred for 30 minutes to obtain a surfactant solution 1-1. 0.08% of alkyl glycoside and 0.07% of sodium alpha-olefin sulfonate were sequentially added to the mineralized water 2-1 to obtain a mixture corresponding to the mineralized water 2-1, and then the mixture corresponding to the mineralized water 2-1 was stirred for 30 minutes to obtain a surfactant solution 2-1. 0.12% of hydroxysultaine and 0.08% of sodium alkylbenzene sulfonate were sequentially added to the mineralized water 3-1 to obtain a mixture corresponding to the mineralized water 3-1, and then the mixture to corresponding to the mineralized water 3-1 was stirred for 30 minutes to obtain a surfactant solution 3-1. 0.15% sodium alpha-olefin sulfonate and 0.05% sodium lignosulfonate were sequentially added to the mineralized water 4-1 to obtain a mixture corresponding to the mineralized water 4-1, and then the mixture corresponding to the mineralized water 4-1 was stirred for 30 minutes to obtain a surfactant solution 4-1. 0.1% hydroxysultaine and 0.1% sodium alpha-olefin sulfonate were sequentially added to the mineralized water 5-1 to obtain a mixture corresponding to the mineralized water 5-1, and then the mixture corresponding to the mineralized water 5-1was stirred for 30 minutes to obtain a surfactant solution 5-1. The nano emulsifier 1 prepared in the Embodiment a was added to the mineralized water 1-2, 2-2, 3-2, 4-2, and 5-2 respectively, and then were stirred and dissolve for 1 hour to obtain dispersion liquids of the nano emulsifier 1 with a mass concentration of 0.5%. The above preparation manner of the dispersion liquids of the nano emulsifier 1 was repeated to respectively prepare dispersion liquids of the nano emulsifier 2, the nano emulsifier 3, and the nano emulsifier 4 with a mass concentration of 0.5%.

An interfacial tension (IFT) between each of two degassed crude oils (viscosities of the two degassed crude oils respectively were 8.6 mPa·s and 32.2 mPa·s at 80° C. and a shear rate of 10 $s^{-1}$) and each of the above surfactant solutions or an interfacial tensions (IFT) between each of two degassed crude oils (viscosities of the two degassed crude oils respectively were 8.6 mPa·s and 32.2 mPa·s at 80° C. and a shear rate of 10 $s^{-1}$) and each of the dispersion liquids of the nano emulsifiers were measured at 80° C. by a TX500C spinning drop tensiometer. After measured for 2 hours, stable values of the interfacial tensions were obtained. The surfactants in mineralized water with a salinity range of $0.3\times10^4$-$10\times10^4$ milligrams per liter may keep the oil-water interfacial tensions equal to or less than $10^{-2}$ mN/m, which indicated that the surfactants have a good ability to aggregate dispersion oil under a condition of the oil reservoir. The oil-water interfacial tensions of the nano emulsifiers in the mineralized water with the salinity range of $0.3\times10^4$-$10\times10^4$ milligrams per liter may be within a range of $10^{-1}$-10 mN/m (an oil-water interfacial tension of magnetic nano ferroferric oxide that is not modified with an oil-soluble surfactant is within a range of 50-60 mN/m), which indicated that a surface of the nano emulsifier modified by the oil-soluble surfactant has certain active substances. The active substances can be effectively adsorbed on the oil-water interface and cause the oil-water interface to bend. The measured interfacial tensions were shown in Table 1 and Table 2.

TABLE 1

Stable Interfacial Tensions between Surfactants and Crude Oil

| Salinity ($10^4$ mg/L) | Viscosity of Crude Oil (mPa · s) | IFT of Surfactants (mN/m) |
|---|---|---|
| 0.3 | 8.6 | 0.022 |
|  | 32.2 | 0.068 |
| 1.5 | 8.6 | 0.032 |
|  | 32.2 | 0.046 |
| 3 | 8.6 | 0.023 |
|  | 32.2 | 0.0092 |
| 5 | 8.6 | 0.0085 |
|  | 32.2 | 0.049 |
| 10 | 8.6 | 0.079 |
|  | 32.2 | 0.025 |

TABLE 2

Stable Interfacial Tensions between Nano emulsifiers and Crude oil

| Salinity ($10^4$ mg/L) | Viscosity of Crude Oil (mPa · s) | IFT of Nano emulsifier 1 (mN/m) | IFT of Nano emulsifier 2 (mN/m) | IFT of Nano emulsifier 3 (mN/m) | IFT of Nano emulsifier 4 (mN/m) |
|---|---|---|---|---|---|
| 0.3 | 8.6 | 0.45 | 0.31 | 0.55 | 1.6 |
|  | 32.2 | 0.79 | 0.57 | 0.61 | 0.72 |
| 1.5 | 8.6 | 0.32 | 0.43 | 0.49 | 1.23 |
|  | 32.2 | 3.6 | 1.3 | 2.7 | 0.95 |
| 3 | 8.6 | 2.1 | 1.8 | 4.6 | 5.9 |
|  | 32.2 | 4.5 | 3.2 | 0.74 | 0.49 |
| 5 | 8.6 | 0.95 | 1.9 | 2.6 | 3.3 |
|  | 32.2 | 2.6 | 0.98 | 2.1 | 0.23 |

TABLE 2-continued

Stable Interfacial Tensions between Nano emulsifiers and Crude oil

| Salinity ($10^4$ mg/L) | Viscosity of Crude Oil (mPa·s) | IFT of Nano emulsifier 1 (mN/m) | IFT of Nano emulsifier 2 (mN/m) | IFT of Nano emulsifier 3 (mN/m) | IFT of Nano emulsifier 4 (mN/m) |
|---|---|---|---|---|---|
| 10 | 8.6 | 3.9 | 2.7 | 5.9 | 0.66 |
|  | 32.2 | 0.86 | 4.7 | 7.7 | 1.2 |

(3) The Wettability of the Nano Emulsifier.

Figure 3:
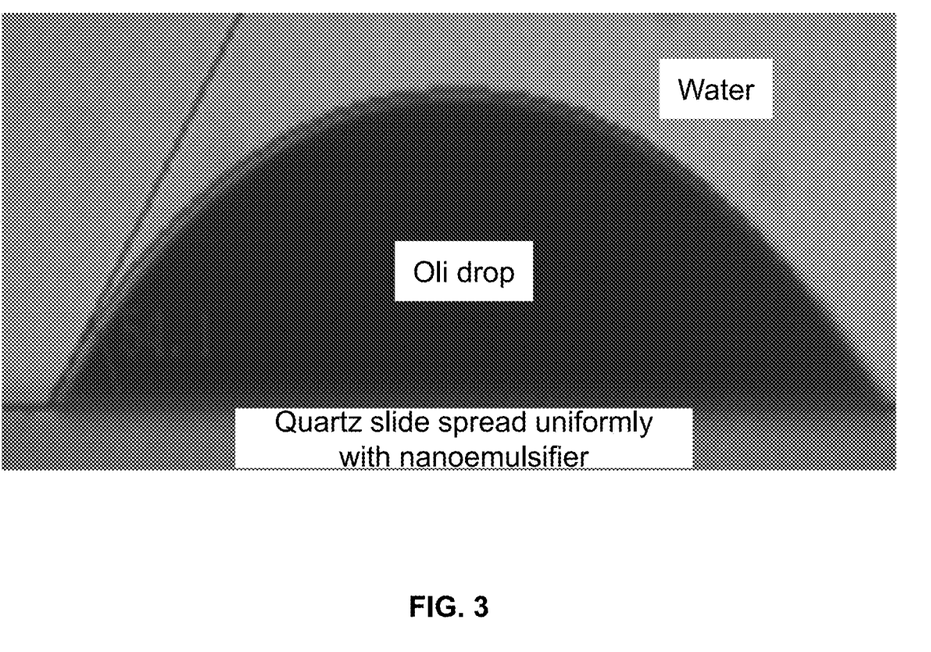
FIG. 3 is a schematic diagram illustrating an oil-water-solid three-phase of a nano emulsifier according to some embodiments of the present disclosure.

The nano emulsifier 1 prepared in the Embodiment a was spread uniformly on a quartz slide. In an aqueous environment with a salinity of $5 \times 10^4$ mg/L (the concentration of $Ca^{2+}$ and $Mg^{2+}$ was $0.07 \times 10^4$ mg/L), an oil-water-solid three-phase contact angle of the nano emulsifier 1 was measured by a HARHE-SPCA contact angle tester (Haako, China). As shown in FIG. 3, the contact angle of the nano emulsifier 1 is 125.9°, which proves that the nano emulsifier 1 is weakly hydrophobic and lipophilic.

(4) The Viscosity (Different Oil-Water Ratios) of the Emulsion Formed by the Dispersion Liquid of the Nano Emulsifier and the Crude Oil.

Mineralized water with a salinity of $10 \times 10^4$ mg/L (the concentration of $Ca^{2+}$ and $Mg^{2+}$ was $0.1 \times 10^4$ mg/L) was prepared. The mineralized water may be added to the nano emulsifiers 1-4 prepared in Embodiments a-d, respectively, and then was stirred and dissolved for 1 hour to prepare dispersion liquids of the nano emulsifiers 1-4 with a mass concentration of 0.6%. Using a special measuring cylinder with a range of 80 milliliters, each of the dispersion liquids of the above nano emulsifiers 1-4 and each of the two degassed crude oils (viscosities of the two degassed crude oils respectively were 8.6 mPa·s and 32.2 mPa·s at 80° C. and a shear rate of 10 $s^{-1}$) were prepared to mixtures each of which has a volume of 50 milliliters respectively according to volume ratios of water to the oil of 2:8, 3:7, 4:6, 5:5, 6:4, 7:3, 8:2, 8.5:1.5 (i.e., moisture contents were 20%, 30%, 40%, 50%, 60%, 70%, 80%, 85%). Further, the mixtures were sealed and stirred for 1 hour in an oil bath at 80° C. Emulsification of the mixtures were observed to obtain emulsions. After the stirring, apparent viscosities of the emulsions were tested by a high temperature and high pressure (HTHP) rheometer at 80° C. and a shear rate of 10 $s^{-1}$. The viscosity of each mixture was shown in Table 3 and Table 4.

TABLE 3

Viscosity of Emulsions Formed by Dispersion liquids of Nano emulsifiers 1-4 and Crude Oil with a Viscosity of 8.6 mPa·s under Different Water-oil Ratios

| Water-oil Ratio (V/V) | Viscosity of emulsions of nano emulsifiers 1-4 (mPa·s) | | | |
|---|---|---|---|---|
|  | Nano emulsifier 1 | Nano emulsifier 2 | Nano emulsifier 3 | Nano emulsifier 4 |
| 2:8 | 13.5 | 9.7 | 16.4 | 16.9 |
| 3:7 | 20.7 | 17.2 | 30.1 | 42.1 |
| 4:6 | 31.6 | 25.5 | 47.9 | 60.2 |
| 5:5 | 49.4 | 39.1 | 55.9 | 78.2 |
| 6:4 | 55.7 | 51.8 | 67.2 | 93.3 |
| 7:3 | 70.4 | 72.4 | 80.3 | 102.6 |
| 8:2 | 79.2 | 83.8 | 99.6 | 120.9 |
| 8.5:1 | 86.1 | 85.1 | 110.4 | 156.7 |

Test condition: Temperature: 80° C., Shear rate: 10 $s^{-1}$, Viscosity of Crude oil: 8.6 mPa·s

TABLE 4

Viscosity of Emulsions Formed by Dispersion liquids of Nano emulsifiers 1-4 and Crude Oil with a Viscosity of 32.2 mPa·s under Different Water-oil Ratios

| Water-oil Ratio (V/V) | Viscosity of Emulsions of Nano emulsifiers 1-4 (mPa·s) | | | |
|---|---|---|---|---|
|  | Nano emulsifier 1 | Nano emulsifier 2 | Nano emulsifier 3 | Nano emulsifier 4 |
| 2:8 | 41.1 | 32.5 | 55.3 | 49.8 |
| 3:7 | 63.4 | 49.1 | 70 | 85.6 |
| 4:6 | 80.7 | 67.8 | 94.4 | 100.2 |
| 5:5 | 91.8 | 86.2 | 111.3 | 131.5 |
| 6:4 | 110.9 | 97.9 | 133.4 | 167.1 |
| 7:3 | 128.5 | 116.8 | 161.7 | 209.6 |
| 8:2 | 143.3 | 129.5 | 198.8 | 278.3 |
| 8.5:1 | 169.2 | 146.6 | 226.7 | 300.9 |

Test condition: Temperature: 80° C., Shear rate: 10 $s^{-1}$, Viscosity of Crude oil: 32.2 mPa·s From the above data, under a condition of 25-85% water saturation of the oil reservoir, the nano emulsifier disclosed in the present disclosure and the crude oil may generate a kinetic stable water-in-oil Pickering emulsion. A viscosity of the Pickering emulsion may be proportional to water saturation of the formation and inversely proportional to oil saturation of the formation. The viscosity of the Pickering emulsion may be 1.5-20 times the viscosity of the crude oil. The type of the nano emulsifier disclosed in the present disclosure may be determined according to the permeability and the heterogeneity of the oil reservoir. The viscosity of the Pickering emulsion in the high-permeability area may be higher than that in the low-permeability area, thereby realizing an adaptive fluidity of the emulsion and stable front of displacement and maximizing the oil displacement.

(5) The Microscopic Morphology of a Water-In-Oil Pickering Emulsion with 85% Moisture Content.

Figure 4:
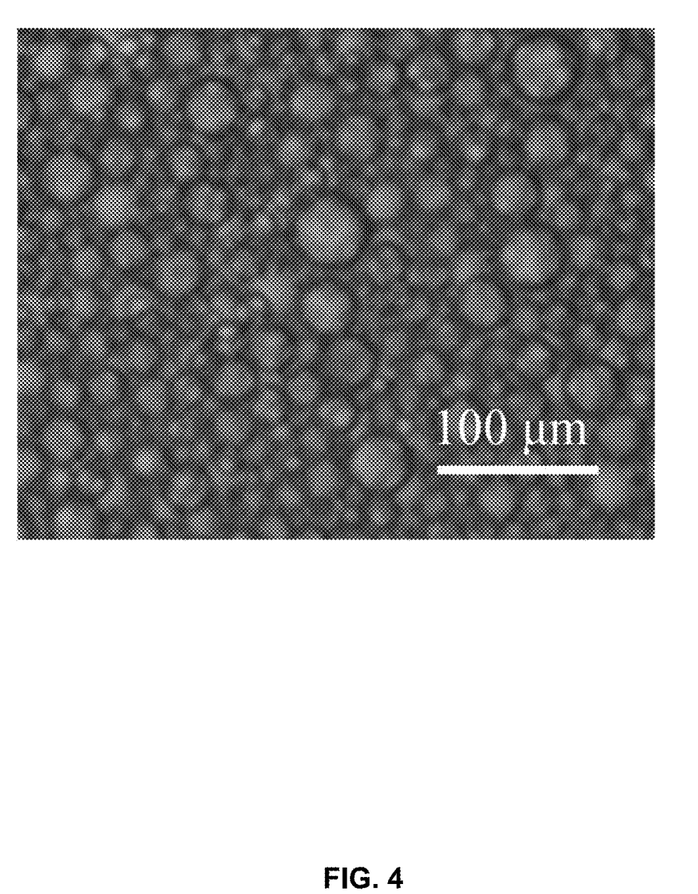
FIG. 4 is a microscopic view illustrating water-in-oil Pickering emulsion formed by a nano emulsifier according to some embodiments of the present disclosure.

The nano emulsifier may be adsorbed on the oil-water interface under the shear induction. Due to the weak oil-wetness of the nano emulsifier, the oil-water interface was reversely bent to form the water-in-oil Pickering emulsion. The viscosity of the Pickering emulsion was higher than that of the crude oil. Under a condition of the moisture content within a range of 20-85%, the Pickering emulsion had no phase change. The viscosity of the Pickering emulsion may be proportional to the moisture content and inversely proportional to the oil content, which indicates characteristics of the Pickering emulsion in terms of self-adaptive fluidity control, stable front of displacement, intelligent displacement, etc., under the condition of the oil reservoir. As shown in FIG. 4, the microscopic morphology of the Pickering emulsion (emulsion with 85% moisture content) is formed by the dispersion liquid of the nano emulsifier 1 and the crude oil with a viscosity of 32.2 mPa·s at a volume ratio of 8.5:1.5. The microscopic morphology may be proved that the water-in-oil Pickering emulsion with a high moisture content still has no phase change. As used herein, the phase change refers to a formation of an oil-in-water emulsion.

Figure 5:
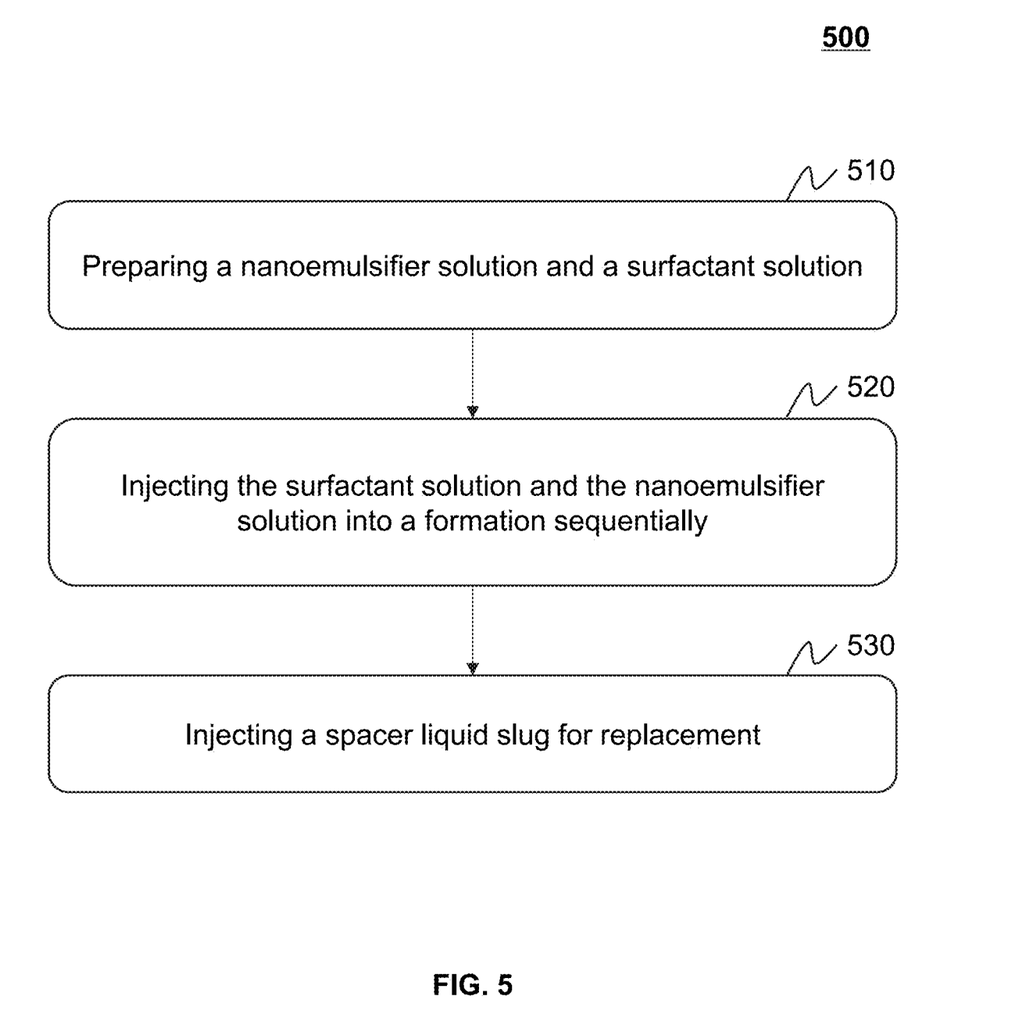
FIG. 5 is a flowchart illustrating an exemplary application process of a nano emulsifier in development of an oil reservoir according to some embodiments of the present disclosure.

FIG. 5 is a flowchart illustrating an exemplary application process 500 of a nano emulsifier in development of an oil reservoir according to some embodiments of the present disclosure.

In 510, a nano emulsifier solution and a surfactant solution may be prepared. The nano emulsifier may be prepared according to process 100 in FIG. 1.

In some embodiments, the nano emulsifier solution may be prepared by injecting water on-site to dissolve the nano emulsifier. Specifically, the water may be injected into the in-situ nano emulsifier on-site, and stirred for a certain time period (e.g., 15 to 60 minutes) until the in-situ nano emulsifier is sufficiently dispersed and dissolved. In some embodiments, a mass concentration of the nano emulsifier solution may be within a range of 0.3-2%. In some embodiments, the mass concentration of the nano emulsifier solution may be within a range of 0.5-1.8%. In some embodiments, the mass concentration of the nano emulsifier solution may be within a range of 0.7-1.6%. In some embodiments, the mass concentration of the nano emulsifier solution may be within a range of 0.9-1.4%. In some embodiments, the mass concentration of the nano emulsifier solution may be within a range of 1.1-1.2%. Merely by way of example, the mass concentration of the nano emulsifier solution may be 0.5%.

In some embodiments, the surfactant solution may be prepared by injecting water on-site to dissolve a surfactant. Specifically, the water may be injected into the surfactant on-site, and stirred for a certain time period (e.g., 15-60 minutes) until the surfactant is sufficiently dispersed and dissolved.

In some embodiments, the surfactant may include sodium alkyl sulfonate, sodium alkyl benzene sulfonate, sodium fatty alcohol polyoxyethylene ether carboxylate, sodium fatty alcohol polyoxyethylene ether sulfonate, hydroxy sulfonate alkali, alkanol amide, alkyl glycoside, sodium alpha-olefin sulfonate, sodium carboxymethyl cellulose, sodium lignosulfonate, or the like, or any combinations thereof. In some embodiments, a mass concentration of the surfactant solution may be within a range of 0.1-0.3%. In some embodiments, the mass concentration of the surfactant solution may be within a range of 0.12-0.28%. In some embodiments, the mass concentration of the surfactant solution may be within a range of 0.14-0.26%. In some embodiments, the mass concentration of the surfactant solution may be within a range of 0.16-0.24%. In some embodiments, the mass concentration of the surfactant solution may be within a range of 0.14-0.22%. In some embodiments, the mass concentration of the surfactant solution may be within a range of 0.16-0.2%. In some embodiments, the mass concentration of the surfactant solution may be within a range of 0.18-0.19%. Merely by way of example, the mass concentration of the surfactant solution may be 0.15%.

In 520, the surfactant solution and the nano emulsifier solution may be injected into a formation sequentially.

In some embodiments, the formation refers to a formation that accumulates oil and gas to form an oil reservoir. In some embodiments, a volume of the nano emulsifier solution injected into the formation may be within a range of 0.2-0.6 times a pore volume of a target oil reservoir. In some embodiments, the volume of the nano emulsifier solution injected into the formation may be within a range of 0.25-0.55 times the pore volume of the target oil reservoir. In some embodiments, the volume of the nano emulsifier solution injected into the formation may be within a range of 0.3-0.5 times the pore volume of the target oil reservoir. In some embodiments, the volume of the nano emulsifier solution injected into the formation may be within a range of 0.35-0.45 times the pore volume of the target oil reservoir. In some embodiments, the volume of the nano emulsifier solution injected into the formation may be within a range of 0.38-0.42 times the pore volume of the target oil reservoir.

In some embodiments, a volume of the surfactant solution injected into the formation may be within a range of 0.05-0.15 times the pore volume of the target oil reservoir. The volume of the surfactant solution injected into the formation may be within a range of 0.07-0.13 times the pore volume of the target oil reservoir. The volume of the surfactant solution injected into the formation may be within a range of 0.09-0.11 times the pore volume of the target oil reservoir.

In 530, a spacer liquid slug may be injected into the formation for replacement.

In some embodiments, a treatment distance between the surfactant and the nano emulsifier may be adjusted by a size of the spacer liquid slug, such that an intelligent oil displacement is realized by the in-situ nano emulsifier. In some embodiments, the spacer liquid slug may be oilfield injection water slug. The oilfield injection water may refer to water injected into the oilfield by a water injection equipment during oilfield exploitation. The oilfield injection water may maintain a pressure of an oil layer, add energy to the formation, and improve an oilfield recovery. In some embodiments, the application process 500 may be applied to all oil reservoirs developed by water injection including high temperature and high salt oil reservoirs and a portion of heavy oil reservoirs by water drive.

Embodiments of the Nano Emulsifier Prepared According to Some Embodiments of the Present Disclosure in Development of an Oil Reservoir: the Influence of the Nano Emulsifier on the Recovery of the Oil Reservoir Mineralized water with a salinity of $10\times10^4$ mg/L (a concentration of $Ca^{2+}$ and $Mg^{2+}$ concentration was $0.1\times10^4$ mg/L) was prepared. The mineralized water was divided into two portions. 0.1% hydroxysultaine and 0.1% sodium alpha-olefin sulfonate were added into one portion of the two portions of the mineralized water and stirred for 30 minutes to prepare a surfactant solution with a mass concentration of 0.2%. The nano emulsifier 1 prepared in the Embodiment a was added into the other portion of the two portions of the mineralized water and stirred for 1 hour to prepare a dispersion liquid of the nano emulsifier 1 with a mass concentration of 0.6%. As a comparison experiment, mineralized water with the same salinity (the salinity was $10\times10^4$ mg/L, that is, the concentration of $Ca^{2+}$ and $Mg^{2+}$ concentration was $0.1\times10^4$ mg/L) as the above-mentioned mineralized water was used to prepare a mixed surfactant solution of 0.2% hydroxysulfobetaine and sodium alpha-olefin sulfonate (a mass ratio of the hydroxysultaine to the sodium alpha-olefin sulfonate was 1/1) and a dispersion liquid (or referred to as nanodispersion liquid) of the nano ferroferric oxide (commercially available, an average particle size was 100 nanometers) with a mass concentration of 0.6%.

Figure 6:
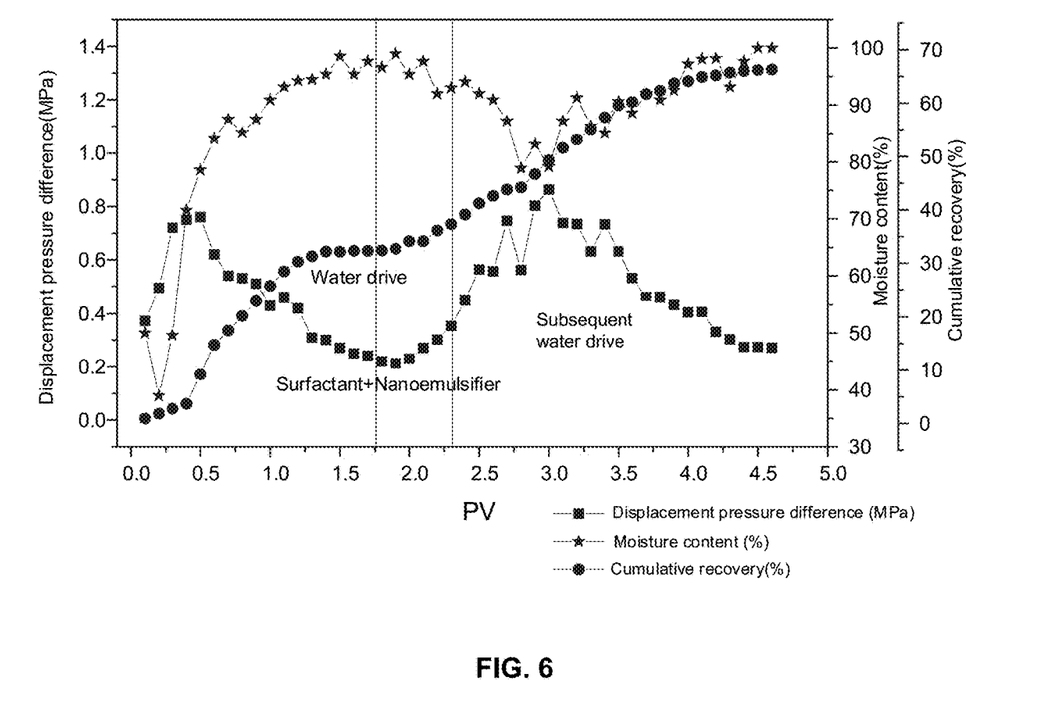
FIG. 6 is a schematic diagram illustrating an effect of an intelligent oil displacement of an in-situ nano emulsifier according to some embodiments of the present disclosure.

Two man-made three-layer heterogeneous long cores (a gas permeability of the two cores was 300/500/2000 mD, porosities of the two cores were 18.7% and 19.3%, respectively) with a size of 45×45×300 micrometers were prepared. An experiment temperature was 80° C., a viscosity of the crude oil was 32.2 mPa·s, and an original oil saturation was 59-63%. In a water drive stage (a rate of the water drive was 1.0 milliliters per minute), the water drive efficiency of the two cores was low (a recovery was about 32-34% when moisture content was 98%) due to an unfavorable water-oil fluidity ratio and extremely poor permeability. Further, the surfactant solution of 0.08 times the pore volume of the two cores was injected into the two cores (an injection rate was 1.0 milliliter per minute). After being adsorbed on a rock surface, the surfactant reduces an adhesion work of the crude oil and the oil-water interfacial tension, and accumulates the dispersed oil in the high permeability area. Subsequently, the dispersion liquid of the nano emulsifier 1 of 0.4 times the pore volume of the two cores was injected into the two cores. As an injection pressure increased, a water-in-oil emulsion was observed at outlet ends of the cores. It should be seen that the nano emulsifier disclosed in the present disclosure may still form a water-in-oil emulsion even under a condition of high moisture content. The water-in-oil emulsion has an excellent ability of flow control in high, medium, and low permeability layers. The water-in-oil emulsion may form a near-miscible displacement with the crude oil, which greatly increases the oil recovery by 35% and enables a cumulative recovery to be up to 67%. FIG. 6 shows the above oil displacement effect.

Figure 7:
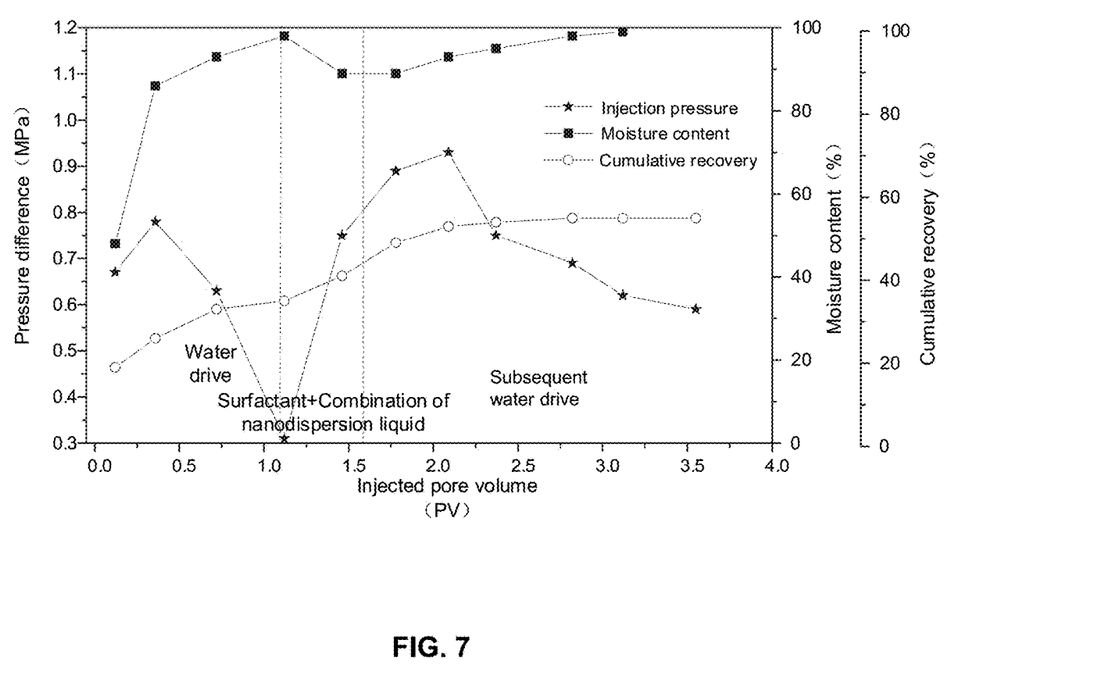
FIG. 7 is a schematic diagram illustrating an effect of an oil displacement of a combination of a surfactant slug and a nanodispersion liquid slug according to some embodiments of the present disclosure.

As a comparison experiment, after the surfactant solution of 0.08 times the pore volume of the two cores (the injection speed was 1.0 milliliter per minute) was injected the two cores, the nano ferroferric oxide dispersion liquid of 0.4 times the pore volume of the two cores was injected into the two cores. A nanometer effect and a regulating effect in hypertonic pores of the dispersion liquid of the nano ferroferric oxide may increase a swept volume. The surfactant, the dispersion liquid of the nano ferroferric oxide, and the subsequent water drive may increase the recovery by 24% and enable the cumulative recovery to be up to 58%. FIG. 7 shows the above oil displacement effect. The comparison experiment proves that under the same concentration and dosage conditions, the in-situ nano emulsifiers disclosed in the present disclosure increase the recovery by 9% than the combination of a surfactant and the dispersion liquid of the nano ferroferric oxide.

The above characterization and experiment indicate a mechanism of intelligent oil displacement of the nano emulsifier as follows. (1) After the surfactant is adsorbed on the rock surface, the surfactant may reduce the adhesion work and the oil-water interfacial tension of the crude oil and accumulate the dispersion oil. (2) The nano emulsifier may be adsorbed on the oil-water interface under the action of formation shear. The weak oil-wetness of the nano emulsifier may enable the oil-water interface reversely bend, thereby forming the water-in-oil Pickering emulsion. (3) The viscosity of the Pickering emulsion may be higher than that of the crude oil. The viscosity of the Pickering emulsion may be proportional to the water saturation of the formation and inversely proportional to the oil saturation of the formation. The Pickering emulsion may have the ability of adaptive flow control, which may effectively inhibit viscous fingering and stabilize the front of displacement. (4) Jiamin effect of the water-in-oil Pickering emulsion may be superimposed, thereby increasing a flow resistance in a high moisture content area, and having an effect of deep profile control. (5) The water-in-oil Pickering emulsion and the crude oil may achieve a near-miscible "piston" displacement, thereby realizing intelligent oil displacement and maximizing the recovery of the crude oil.

The nano emulsifier disclosed in the present disclosure may be directly dispersed by the oilfield injection water. The viscosity of the nano emulsifier may be slightly higher than that of the oilfield injection water. Therefore, the nano emulsifier may have a good injection property. Under the condition that the water saturation of the oil reservoir is 25-85%, the nano emulsifier disclosed in the present disclosure and the crude oil may generate a kinetic stable water-in-oil Pickering emulsion. The water-in-oil Pickering emulsion may not undergo a phase change within the range of the water saturation of the oil reservoir. The viscosity of the Pickering emulsion may be proportional to the water saturation of the formation and inversely proportional to the oil saturation of the formation. The viscosity of the Pickering emulsion may be 1.5-20 times the viscosity of the crude oil. The viscosity of the Pickering emulsion in the high-permeability area may be higher than that in the low-permeability area, thereby realizing the self-adaptive fluidity of the emulsion, the stable front of displacement, and maximizing the oil displacement.

The present disclosure may have the following beneficial effects. (1) The nano emulsifier may be directly injected using a water injection system, which is a quick-dissolving system, occupies a small area, and has a very simple injection process. (2) The nano emulsifier may have dual functions including polymer fluidity control and improve the water-oil-rock properties by surfactants. (3) The processing of produced liquid from the oil reservoir development may be less difficult. The produced liquid may be demulsified under a condition of an external magnetic field. (4) The application range of the nano emulsifier may be wide. The nano emulsifier may be suitable for all oil reservoirs developed by water injection including high temperature and high salt oil reservoirs and a portion of heavy oil reservoirs by water drive. (5) The economic benefits may be outstanding. The nano emulsifier may greatly increase the recovery of the oil reservoir by water drive. The application prospect of the nano emulsifier may be very broad.

What is claimed is:

1. A method for preparing an in-situ nano emulsifier, comprising:
    to a three-necked flask of 500 milliliters,
        adding 80-160 grams of deionized water; and
        adding sequentially 5-8 grams of hydrated ferric chloride and 1.2-1.6 grams of hydrated ferrous sulfate;
    stirring a mixture in the three-necked flask at room temperature for 30-60 minutes to ensure sufficient dissolution;
    dissolving 0.5-1.2 grams of an oil-soluble surfactant in 10-30 grams of ethanol in an ice-salt bath, wherein the oil-soluble surfactant includes at least one of oleic acid diethanolamide or polyoxyethylene fatty alcohol ether;
    sealing and stirring the ethanol solution dissolved with the oil-soluble surfactant for 10-20 minutes to ensure sufficient dissolution;
    under protection of inert gas, adding 70-160 milliliters of ammonia water and the ethanol solution dissolved with the oil-soluble surfactant into the three-necked flask through two dropping funnels at a constant speed for 2-4 hours simultaneously, during the adding process, the mixture in the three-necked flask being stirred quickly to ensure that the mixture in the three-necked flask is evenly mixed, wherein a mass concentration of the ammonia water is 25%, and the inert gas is nitrogen;
    continuing stirring the mixture in the three-necked flask for 1-1.5 hours after the adding process;
    performing a suction filtration on the mixture after completion of the reaction to collect a solid product; and
    obtaining the in-situ nano emulsifier by grinding the solid product after dried in a vacuum at 50° C., wherein the in-situ nano emulsifier is magnetic nano ferroferric oxide that is modified by the oil-soluble surfactant.

2. The method of claim 1, wherein a wettability of the nano emulsifier is adjusted by selecting a type and an amount of the oil-soluble surfactant based on a geological condition of an oil reservoir and a viscosity of crude oil, the geological condition of the oil reservoir including a size of permeability and heterogeneity of the oil reservoir.

3. The method of claim 1, wherein the oil-soluble surfactant further includes at least one of dodecylamine or octadecyl primary amine.

4. The method of claim 1, wherein the in-situ nano emulsifier is applied to development of the oil reservoir through an application process, the application process including:
    injecting water into the in-situ nano emulsifier and stirring 15-60 minutes to fully disperse and dissolve the in-situ nano emulsifier such that a nano emulsifier solution is prepared, a mass concentration of the nano emulsifier solution being 0.3-2%;
    injecting water into a surfactant and stirring for 15-60 minutes to fully disperse and dissolve the surfactant such that a surfactant solution is prepared, a mass concentration of the surfactant solution being 0.1-0.3%;
    injecting the surfactant solution of 0.05-0.15 times a pore volume of a target oil reservoir into a formation;
    injecting the nano emulsifier solution of 0.2-0.6 times the pore volume of the target oil reservoir into the formation; and
    injecting a certain amount of oilfield injection water slug for replacement.

5. The method of claim 4, wherein the surfactant includes at least one of sodium alkyl sulfonate, sodium alkylbenzene sulfonate, sodium fatty alcohol polyoxyethylene ether carboxylate, sodium fatty alcohol polyoxyethylene ether sulfonate, hydroxysulfobetaine, alkanolamide, alkyl glycoside, sodium alpha-olefin sulfonate, sodium carboxymethyl cellulose, or sodium lignosulfonate, an oil-water interfacial tension of the surfactant in the oil reservoir being equal to or less than 10-2 mN/m.

6. The method of claim 4, wherein the mass concentration of the nano emulsifier solution is 0.5% and the mass concentration of the surfactant solution is 0.15%.

7. The method of claim 4, wherein the application process is applied to all oil reservoirs developed by water injection including high temperature and high salt oil reservoirs and a portion of heavy oil reservoirs by water drive.

8. The method of claim 4, wherein a treatment distance between the surfactant and the nano emulsifier is adjusted based on a size of a spacer liquid slug, such that an intelligent oil displacement is realized by the in-situ nano emulsifier.

* * * * *